(12) United States Patent
Beaber et al.

(10) Patent No.: US 11,639,316 B2
(45) Date of Patent: May 2, 2023

(54) FIBER TOWS WITH A HEAT-ACTIVATED SIZING

(71) Applicant: 3M INNOVATIVE PROPERTIES COMPANY, St. Paul, MN (US)

(72) Inventors: Aaron R. Beaber, Minneapolis, MN (US); Kari A. McGee, New Brighton, MN (US); Kimberly C. M. Schultz, Woodbury, MN (US); Erica M. McCready, Cottage Grove, MN (US); Aric W. Ross, Maplewood, MN (US); Zachary A. Danielson, Maplewood, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/279,685

(22) PCT Filed: Sep. 25, 2019

(86) PCT No.: PCT/US2019/052982
§ 371 (c)(1),
(2) Date: Mar. 25, 2021

(87) PCT Pub. No.: WO2020/068999
PCT Pub. Date: Apr. 2, 2020

(65) Prior Publication Data
US 2022/0033319 A1 Feb. 3, 2022

Related U.S. Application Data

(60) Provisional application No. 62/736,960, filed on Sep. 26, 2018.

(51) Int. Cl.
*C04B 41/45* (2006.01)
*C04B 41/00* (2006.01)
(Continued)

(52) U.S. Cl.
CPC ............ *C04B 41/4584* (2013.01); *B32B 5/26* (2013.01); *B32B 18/00* (2013.01); *C04B 35/80* (2013.01);
(Continued)

(58) Field of Classification Search
CPC .............. C04B 41/4584; C04B 41/009; C04B 41/4539; C04B 41/4869; C04B 41/4873; C04B 41/488
See application file for complete search history.

(56) References Cited

U.S. PATENT DOCUMENTS 4,808,451 A * 2/1989 McCue ................. E04F 19/026
24/292
5,419,962 A 5/1995 Robertson
(Continued)

FOREIGN PATENT DOCUMENTS

CN 1150105 5/1997
CN 1261186 6/2006
(Continued)

OTHER PUBLICATIONS

Mason, Thomas O.. "ceramic composition and properties". Encyclopedia Britannica, Jan. 24, 2011, https://www.britannica.com/topic/ceramic-composition-and-properties-103137. Accessed Aug. 12, 2022. (Year: 2011).*
(Continued)

*Primary Examiner* — Alex B Efta
(74) *Attorney, Agent, or Firm* — Thomas M. Spielbauer

(57) ABSTRACT

Fiber tows including a heat-activatable sizing are described. The sizing compositions have a first modulus at 25° C. of at least 150 megapascals (MPa) and no greater than 400 MPa; and a second modulus of 100,000 pascals (Pa) at a temperature of no greater than 160° C. Methods of preparing articles from such sized fiber tows and the articles comprising such
(Continued)

sized fiber tows, including unidirectional and bidirectional constructions are also described.

23 Claims, 2 Drawing Sheets

(51) Int. Cl.
    *C04B 41/48* (2006.01)
    *B32B 5/26* (2006.01)
    *B32B 18/00* (2006.01)
    *C04B 35/80* (2006.01)
    *C04B 41/83* (2006.01)

(52) U.S. Cl.
    CPC ........ *C04B 41/009* (2013.01); *C04B 41/4539* (2013.01); *C04B 41/488* (2013.01); *C04B 41/4869* (2013.01); *C04B 41/4873* (2013.01); *C04B 41/83* (2013.01); *C04B 2235/5224* (2013.01); *C04B 2235/5252* (2013.01)

(56) References Cited

U.S. PATENT DOCUMENTS

| | | | |
|---|---|---|---|
| 5,591,306 A | 1/1997 | Kaun | |
| 6,103,809 A * | 8/2000 | Ahmed | A61L 15/62 525/425 |
| 6,630,050 B1 | 10/2003 | Moeller | |
| 6,723,306 B2 | 4/2004 | Gueret | |
| 6,808,597 B2 | 10/2004 | Allen | |
| 2005/0137375 A1 | 6/2005 | Hansen | |
| 2007/0154697 A1* | 7/2007 | Cossement | C08L 77/00 428/292.1 |
| 2007/0173588 A1 | 7/2007 | Espiard | |
| 2007/0178304 A1* | 8/2007 | Visser | C04B 35/63488 428/375 |
| 2010/0260998 A1* | 10/2010 | Waicukauski | B82Y 30/00 977/773 |
| 2011/0019280 A1 | 1/2011 | Lockridge | |
| 2012/0058698 A1 | 3/2012 | Lin | |

FOREIGN PATENT DOCUMENTS

| | | |
|---|---|---|
| CN | 101255671 | 9/2008 |
| CN | 103333514 | 10/2013 |
| JP | 05065465 | 3/1993 |
| JP | 07150476 | 6/1995 |
| JP | 2002105432 | 4/2002 |
| JP | 2017203236 | 11/2017 |
| WO | WO 2000-015728 | 3/2000 |
| WO | WO 2001-034385 | 5/2001 |
| WO | WO 2016-193927 | 12/2016 |
| WO | WO-2016193927 A1 * | 12/2016 ........... D06M 15/37 |
| WO | WO 2019-142168 | 7/2019 |

OTHER PUBLICATIONS

International Search Report for PCT International Application No. PCT/US2019/052982, dated Mar. 12, 2019, 5 pages.

* cited by examiner

FIBER TOWS WITH A HEAT-ACTIVATED SIZING

CROSS REFERENCE TO RELATED APPLICATIONS

This application is a national stage filing under 35 U.S.C. 371 of PCT/US2019/052982, filed Sep. 25, 2019, which claims the benefit of Provisional Application No. 62/736,960, filed Sep. 26, 2018, the disclosure of which is incorporated by reference in their entirety herein.

FIELD

The present disclosure relates to fiber tows having a heat-activatable sizing, for example, spread tows of ceramic fibers with a heat-activated sizing. Such sized tows may be used to create a variety of products including unidirectional and multi-directional tapes and fabrics that may be used in composites.

SUMMARY

Briefly, in one aspect, the present disclosure provides a sized tow comprising a tow of fibers and a sizing composition comprising a polymer covering at least a portion of the tow, wherein, as measured according to the Modulus Procedure, the sizing composition has a first modulus at 25° C. of at least 150 megapascals (MPa) and no greater than 400 MPa; and a second modulus of 100,000 pascals (Pa) at a temperature of no greater than 160° C. In some embodiments, the fibers are ceramic fibers, e.g., ceramic fibers comprise alpha-alumina. In some embodiments, the sizing composition is soluble (e.g., dispersible) in water.

In some embodiments, the polymer of the sizing composition comprises one or more of a poly(2-ethyl-2-oxazoline) polymer, a vinyl acetate copolymer (e.g., a vinylpyrrolidone-vinyl acetate copolymer, or a vinyl acetate-crotonic acid copolymer), or a polyvinyl alcohol. In some embodiments, the sizing composition further comprises a plasticizer for the polymer, e.g., a polyol, such as glycerol.

In another aspect, the present disclosure provides a method of making an article comprising positioning a first tow of fibers in contact with a second tow of fibers forming a contact area between the tows, wherein the first tow of fibers comprises a first sized tow comprising the sizing composition according to any of the embodiments of the present disclosure; heating at least a portion of the contact area to a temperature greater than the temperature at which the second modulus of the sizing composition is 100,000 Pa, and bonding the first tow of fibers to the second tow of fibers.

In yet another aspect, the present disclosure provides an article comprising a first tow of fibers comprising the sizing composition according to any of the embodiments of the present disclosure and having a first longitudinal axis; and a second tow of fibers comprising the sizing composition according to any of the embodiments of the present disclosure and having a second longitudinal axis, wherein the first and second tows are bonded to each other. In some embodiments, the first and second tows are aligned such that the angle between the first and second longitudinal axes is at least 30 degrees and no greater than 90 degrees. In some embodiments, the second tows are stacked on the first tows and are not interwoven with the first tows.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
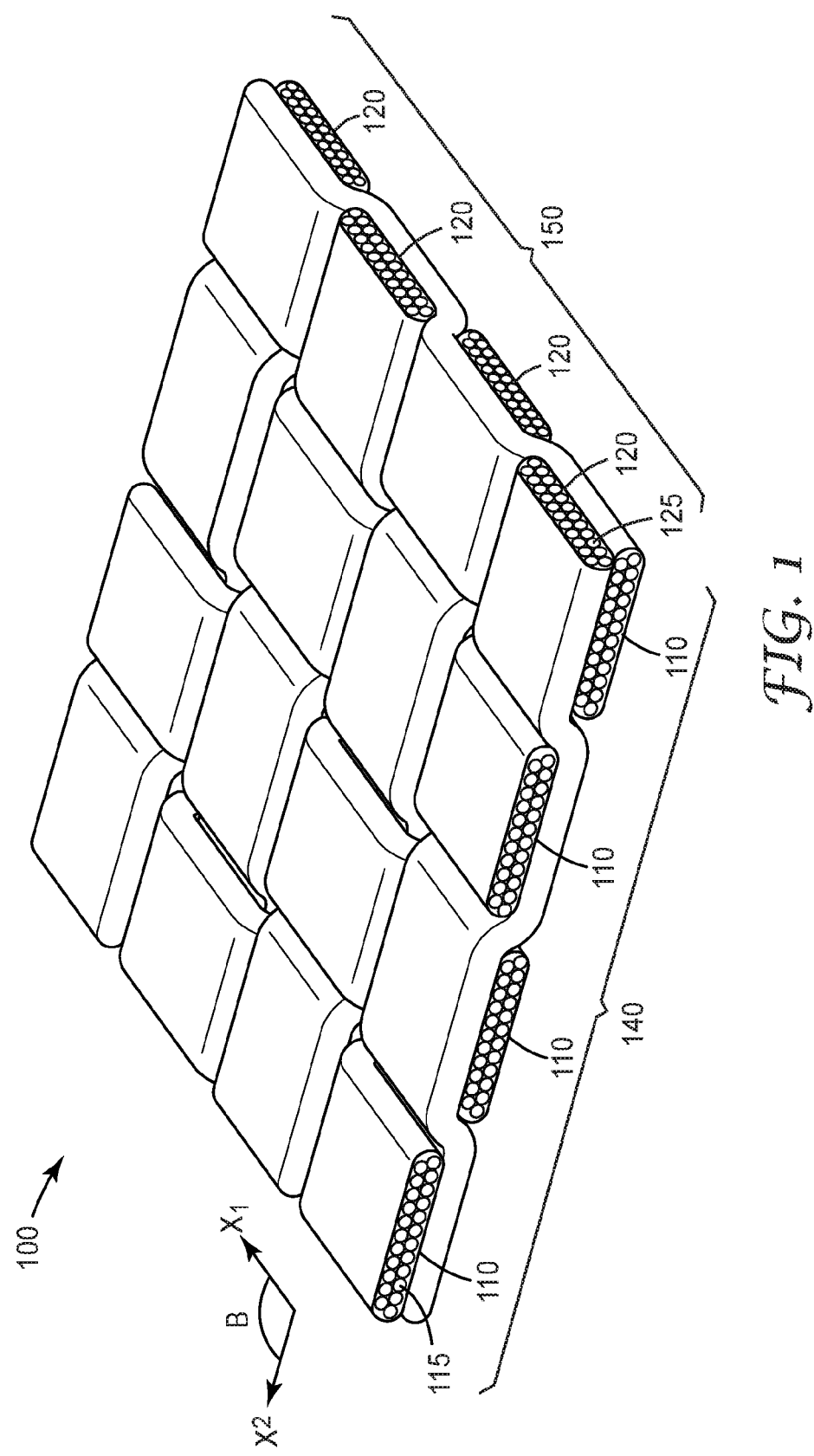
FIG. 1 illustrates a woven fabric according to some exemplary embodiments of the present disclosure.

Ceramic fibers are well-known and available from a variety of commercial sources. Oxide-based ceramic fibers include, e.g., alumina fibers and alumina-silica fibers. Oxide-based ceramic fibers may include additional components such as boria, alkaline earth oxides, alkali metal oxides, and metals. Nonoxide-based ceramic fibers are based on carbides and nitrides, including oxynitrides, oxycarbides, and oxycarbonitrides. Exemplary nonoxide-based ceramic fibers include silicon carbide, silicon nitride, silicone oxycarbides, and silicon oxycarbonitrides fibers. Such nonoxide-based ceramic fibers may include additional components such as metals or carbon.

Ceramic fibers are useful in a wide variety of applications. For example, composites may be formed by embedding ceramic fibers in a variety of matrices including polymers (i.e., polymer matrix composites, "PMC"), metals (i.e., metal matrix composites "MMC"), and ceramics (i.e., ceramic matrix composites "CMC"). In some embodiments, ceramic matrix composites, which comprise reinforcing ceramic fibers embedded in a ceramic matrix, can provide superior performance including high-temperature resistance and stability, mechanical strength, hardness, and corrosion resistance.

Ceramic fibers are available as individual fibers (sometimes referred to as filaments) or as tows. A tow (sometimes referred to as a strand or roving) is a bundle of fibers aligned along a common axis. Generally, individual ceramic fibers may have a diameter of about 5 to 20 micrometers, e.g., at least 8 microns to less than 15 microns. Tows of such fibers may have a nominal fiber count of at least 200, e.g., at least 400 fibers. In some embodiments, the nominal fiber count may be as high as 1125, 2550, 5100, or even greater. Tows of ceramic fibers are also available as yarns consisting of multiple tows twisted together.

More recently, ceramic fibers have become available in a new form factor, i.e., spread tows. Beginning with traditional, elliptical-shaped tows, spread tows may be formed using any known methods including those suitable for use with carbon fibers, e.g., the use of spreader bars. Such techniques spread the fibers of the bundle, significantly increasing the width of the tow while reducing the thickness.

As used herein a "spread tow" refers to a tow of fibers having an aspect ratio (A2/A1) of no greater than 0.1, wherein A1 is the width of the tow and A2 is the thickness. For comparison, traditional circular or elliptical tows may have an aspect ratio ranging from 1 to 0.2. In some embodiments, the aspect ratio of the spread tow is no greater than 0.05, e.g., no greater than 0.04, no greater than 0.03 or even no greater than 0.02. In some embodiments, the aspect is greater than 0.002, e.g., greater than 0.005. In some embodiments, the aspect ratio is between 0.005 and 0.1, e.g., between 0.01 and 0.05, e.g., between 0.01 and 0.03, wherein all ranges are inclusive of the end points.

A spread tow could be as thin as a single layer of fibers. However, in some embodiments, the spread tow has an average thickness of at least 5 fibers, e.g., at least 10 fibers. In some embodiments, the thickness of the spread tow will be no greater than 25 fibers, e.g., no greater than 20 fibers, or even no greater than 15 fibers.

The significantly lower aspect ratio achieved with spread tows results in much more compact packing of the ceramic fibers, less open volume between tows, and, as a result, a significant reduction in the matrix-rich regions associated with circular spread tow constructions. Some advantages of the very low aspect ratio of spread tows of ceramic fibers can be realized when using individual spread tows using fiber placement mechanisms such as filament winding and advanced fiber placement.

As described in U.S. Provisional Patent Application 62/610,247 ("Woven Fabric of Ceramic Spread Tow" filed Jan. 22, 2018), spread tows are also useful when creating woven fabrics of ceramic fibers. The use of spread tows of ceramic fibers to produce woven fabrics can offer significant advantages over similar fabrics made from traditional circular tows. For example, the combination of greater width and lower thickness for the same fiber count will lead to much less undulation in thickness produced by the weaving pattern. Also, the spread tow will result in lower weight fabrics based on weight per unit area. Higher fiber to matrix ratios can be obtained as gaps leading to matrix-rich regions can be reduced.

Despite the advantages of making woven fabrics with spread tows rather than traditional tows, certain challenges remain. Ceramic fibers tend to be more brittle than other composite fibers such as polymer or carbon fibers. Thus, ceramic fibers are more prone to breaking when bent, particularly at the sharp bends that can arise when weaving the fill (or weft) tows over and under the warp tows of the fabric. Also, although undulation is reduced when using thinner spread tows, the weaving patterns can still generate gaps leading to weaker, matrix-rich regions in the final composite.

Traditionally, tows have been coated with, e.g., a sizing agent or finishing agent. Such coatings typically contain a variety of organic compounds selected for the desired benefits. The sizings used have been non-tacky to facilitate weaving, winding and roll-to-roll handling of the sized fibers. For example, the sizing composition may have been selected to provide lubricity and other features that are advantageous or necessary in typical weaving operations.

For tows used with a polymeric matrix, the coating may be selected to provide compatibility between the ceramic fibers and the polymeric matrix. In such applications, the coating can remain on the fibers during the step in which the polymeric matrix infuses the sized ceramic fiber tow. The presence of the sizing in subsequent, low-temperature processing steps such as curing of a polymeric matrix does not create problems.

In contrast, ceramic matrix composites ultimately undergo high-temperature sintering processes. Exposure to these temperatures can result in degradation and even charring of the sizing material. This can lead to unacceptable defects such as voids or contaminants in the finished part. Also, the organic coating can inhibit the formation of intimate contact between the ceramic fibers and the ceramic matrix, resulting in poor physical properties. Therefore, when preparing ceramic matrix composites, uncoated tows are used, e.g., the coating is removed prior to infusing the tows with the ceramic matrix. For example, coated tows may be heat-treated to burn off any coating materials.

In a typical CMC processes, a tow of uncoated (e.g., heat-treated) ceramic fibers is impregnated with the ceramic matrix material to form a ceramic prepreg (also referred to as a tow-preg). In one common method, the ceramic fibers are exposed to (e.g., dipped into) a slurry comprising a ceramic precursor and a solvent. The solvent and ceramic precursor are infused into the bundle of ceramic fibers to form the prepreg. This prepreg may be wound onto cores for use in a later process. In other cases, the prepreg is immediately transported to further processes in-line with the impregnation step.

As described in co-owned U.S. Provisional Patent Application 62/620,255 ("Method of Making Ceramic Matrix Slurry Infused Ceramic Tows and Ceramic Matrix Composites" filed Jan. 22, 2018), solvent-soluble sizings may also be used. Such sizings may be selected to facilitate their dispersion or dissolution into the solvent(s) used in the ceramic matrix slurry. The use of soluble sizings can eliminate the need for pre-cleaning (e.g., burn-off) to remove the sizing.

As prior sizings were non-tacky, weaving was necessary to produce tapes and fabrics of tows. For example, polymeric, glass or ceramic fibers have been used to stitch adjacent tows of fibers together to form wider tapes. As discussed above, fabrics have been formed by interweaving tows of ceramic fibers. Both form factors can result in broken ceramic fibers, and gaps leading to matrix-rich regions.

The present inventors have developed a new class of sizing materials, particularly, heat-activated sizing materials. These sizing materials can be used with any fibers (e.g., ceramic, carbon, glass, or polymeric) and with any form factor (e.g., traditional circular tows and spread tows). However, in some embodiments, these sizing materials may lead to greater advantages when used with spread tows of ceramic fibers. In some embodiments, additional advantages may be obtained when spread tows of ceramic fibers are formed into stacked (non-woven) unidirectional and multi-directional fabrics, as described herein.

The present inventors discovered that, by selecting the composition and, in some embodiments, the coat weight, such sizings can be non-tacky at room or even slightly elevated temperatures to retain the desired weaving, handling, and roll-to-roll processing capabilities. However, at elevated temperatures, the sizing becomes tacky such that multiple tows may be bonded together to form constructions without the need for stitching or weaving. After the bonded structures are formed and allowed to cool, the sizing returns to its non-tacky state to facilitate further handling and processing.

For example, adjacent parallel tows, e.g., spread tows, can be bonded together to form unidirectional tapes or even wide unidirectional fabrics without the need for cross-directional stitching. Alternatively, tows (e.g., spread tows) can be overlaid (stacked) in patterns to form fabrics without the need for weaving. The sized tows of the present disclosure are also useful in bi(multi)axial weaves. The tacky sizing can secure the edges of the fabric, which are typically taped or woven with a fine denier thread. In addition, the sizing provides greater stability in transportation and handling of the fabrics, compared to heat cleaned fabrics, which are unstable.

Generally, the chemical compositions of the sizings of the present disclosure are less critical than their physical properties. The starting point is to identify materials that will readily dissolve or disperse in the desired solvent, e.g., the solvent present in the ceramic matrix slurry.

Suitable solvents include water and organic solvents. In some embodiments, water is a preferred solvent, either alone or in combination with an organic solvent. Suitable organic solvents include, e.g., alcohols (e.g., methyl, ethyl, isopropyl, and t-butyl alcohols); aromatic hydrocarbons (e.g., benzene, toluene and xylene); aliphatic hydrocarbons (e.g., heptane, hexane, and octane); glycol ethers (e.g., propylene glycol methyl ether); dipropylene glycol; ethers (e.g., methyl ether, propylene glycol n-butyl ether, propylene glycol n-propyl ether, and ethylene glycol n-butyl ether); ketones (e.g., methyl ethyl ketone and methyl isobutyl ketone); and halogenated hydrocarbons such as 1,1,1-trichloroethane and methylene chloride. In some embodiments, isopropanol, ethanol, butanol, and various acetates may be preferred due to toxicity concerns.

For water-based slurries, the initial performance criteria for coating chemistries include high water solubility, good tow bundling (i.e., film forming), good tow flexibility (i.e., not stiff or brittle), and low charring performance during burn-off. Suitable chemistries include many water-soluble organics, such as polyurethanes, polyvinyl alcohol, glycols (e.g., polyethylene glycol, propylene glycol), polyols (e.g., glycerol), polyolefin oxides (e.g., ethylene oxide, propylene oxide, and copolymers thereof), polyvinyl acetate, polyoxazolines, polyacrylamides, and polyvinylpyrrolidone, as well as copolymers and blends of any of these. In addition, common ceramic binders and additives including carboxymethyl cellulose, cell gum, guar gum, acacia gum, and sugars (e.g., sucrose or dextrose) can be used either by themselves or in combination.

Similarly, for solvent based matrix slurries, the initial performance criteria for sizing chemistries includes solvent solubility, good tow bundling, good tow flexibility, and low charring performance during burn-off. An added criterion is solubility in a solvent with low toxicity. Potential coatings include polyvinyl butyral (PVB) and acrylics, as well as polyolefins (e.g., polyethylene), silicones, polyesters, styrene/maleic acid copolymers, styrene/acrylate copolymer, acrylate/acrylamide copolymer, polymethylmethacrylate, microcrystalline wax, hydrogenated polyisobutene s, polydecenes, silicones like polydimethylsiloxanes, oxidized polyethylenes and functional groups containing copolymers of polyethylenes, acrylates/tert-octyl-propenaminde copolymers polyvinylpyrrolidone as well as water soluble versions.

In some embodiments, not all of the coating is dissolved in the solvent. In some embodiments, a portion of the coating may be insoluble. These materials may still be removed and dispersed into the ceramic matrix slurry.

Generally, the sizing composition may be applied to the ceramic fibers using any known means. For example, tows or spread tows could be unwound from a fixture containing, e.g., a core chuck and magnetic brake. If multiple tows are processed together, the tows may be steered such that they are aligned parallel to one another and with minimal gaps between the tows.

In some embodiments, the tows could then be passed underneath a set of nozzles spraying a solution of the desired tacky sizing. In some embodiments, the tows can be dip coated or squeeze coated with a solution of the desired tacky sizing. Regardless of how the sizing is applied, the sizing may be dried by any known means. For example, the tows may then be passed through an oven or underneath a series of heaters, e.g., IR lamps, to dry the sizing. Finally, the sized tows may be collected on a core on a winder.

Examples

TABLE 1

Summary of materials used in the preparation of the examples.

| Name | Description | Trade Name and Source |
|---|---|---|
| P(2E-2O)-5 | poly(2-ethyl-2-oxazoline) (5K MW) CAS # 25805-17-8 | AQUAZOL 5 Polymer Chem. Innovations, Inc. |
| P(2E-2O)-50 | poly(2-ethyl-2-oxazoline) (50K MW) | AQUAZOL 50 |
| P(2E-2O)-200 | poly(2-ethyl-2-oxazoline) (200K MW) | AQUAZOL 200 |
| P(2E-2O)-500 | poly(2-ethyl-2-oxazoline) (500K MW) | AQUAZOL 500 |
| VA-CA | vinyl acetate-crotonic acid copolymer CAS # 25609-89-6 | VINNAPAS C 305 Wacker Chemie AG |
| VP-VA | vinyl pyrrolidone-vinyl acetate copolymer CAS # 25086-89-9 | SOKOLAN VA 64P BASF |
| PVA-205 | polyvinyl alcohol (87-89% hydrolyzed) CAS #25213-24-5 | SELVOL 205 and 21-205 Sekisui Spec. Chemicals, LLC |
| PVA-502 | polyvinyl alcohol (87-89% hydrolyzed) | SELVOL 502 |
| PET-WB50 | polyester resin | US 2011/0019280 |
| glycerol | Glycerol (plasticizer) | CAS # 56-81-5 |
| AMP | 2-amino-2-methyl-1-propanol (base) | CAS # 124-68-5 |

Water-based sizings were prepared from these materials as summarized in Table 2A. Sizing solutions S-1 through S-4 were prepared by combining the poly(2-ethyl-2-oxazoline) polymers with deionized water, shaking vigorously, and then agitating via rolling overnight. Sizing solution S-5 was prepared by combining the vinyl acetate-crotonic acid copolymer with deionized water, AMP and methanol with stirring, then agitating via rolling overnight. Sizing solution S-6 was used as the nominal 21 wt. % solution in water, as received (SELVOL 21-205, Sekisui Spec. Chemicals, LLC). The measured solids content was 23 wt. %. Sizing solution S-7 was prepared by combining the vinyl pyrrolidone-vinyl acetate copolymer with water in a plastic container and shaking vigorously. A 32 wt. % solids VP-VA/PVA-205 sizing solution was prepared at both a 20:80 (S-8A) and 40:60 (S-8B) wt. ratio using the following procedure. VP-VA a 40 wt. % solids solution and PVA-205 as a 23 wt. % solids solution were combined in the desired ratio. The entire formulation was diluted with water, so the total solids were 32%. The materials were added to a glass jar and agitated on a roller for at least 30 minutes.

TABLE 2A

Composition of water-based sizings.

| I.D. | Polymer | DI water (g) | Polymer (g) | AMP (g) | MeOH (g) |
|---|---|---|---|---|---|
| S-1 | P(2E-2O)-5 | 250 | 250 | — | — |
| S-2 | P(2E-2O)-50 | 583 | 250 | — | — |
| S-3 | P(2E-2O)-200 | 583 | 250 | — | — |
| S-4 | P(2E-2O)-500 | 583 | 250 | — | — |
| S-5 | VA-CA | 140 | 161 | 42.3 | 120 |
| S-6 | PVA-205 | Obtained as a 23 wt. % sol'n. | | | |
| S-7 | VP-VA | 420 | 280 | — | — |
| S-8A | VP-VA/PVA-205 | Prepared as a 32 wt. % solution at a 20:80 wt. ratio | | | |

TABLE 2A-continued

Composition of water-based sizings.

| I.D. | Polymer | DI water (g) | Polymer (g) | AMP (g) | MeOH (g) |
|---|---|---|---|---|---|
| S-8B | VP-VA/PVA-205 | Prepared as a 32 wt. % solution at a 40:60 wt. ratio | | | |

Additional water-based sizings were prepared as summarized in Table 2B. Sizing S-9 was prepared as follows. To a 3-necked round bottom flask equipped with a thermocouple and overhead stirring 253 grams of deionized water was added, followed by the 53.2 grams of the WB-50 polyester resin (prepared as disclosed in US 2011/0019280), and 53.2 grams of isopropanol. The batch was heated to 82° C. for 90 minutes. Isopropanol was then stripped off by raising the batch temperature to a value of 99° C. and holding for 30 minutes. The batch was then cooled to ambient temperature and 1 gram of a non-ionic surfactant (TOMADOL 25-9 from Evonik Industries) and 24.2 grams of a film-forming polyester solution (EASTEK 1100 from Eastman Chemical) were added along with 9 grams of deionized water. The solids content was determined to be 20.7% by weight loss.

Sizing S-10 was prepared by slowly adding 276 g PVA-205, obtained as a solid, to room temperature water (2480 g) with vigorous mixing to prevent agglomeration of particles due to hydration of the surface and swelling of the polymer particles. This mixture was heated to 80-85° C. leading to the dissolution of the polymer. The solid content of the solution was 9.5 wt. %. Generally, sizings S-6 and S-10 have the same chemical composition, but were prepared by different methods.

Sizing S-11 was prepared by slowly adding 149 g PVA-502 to room temperature water (1337 g) with vigorous mixing to prevent agglomeration of individual particles due to hydration of the surface and swelling of the polymer particles. This mixture was heated to 80-85° C. leading to the dissolution of the polymer. The solid content of the solution was 10.1 wt. %.

Sizing S-12 was prepared by combining 42 grams of glycerol with 450 g of water and shaking. The solids content was 7.7 wt. %.

TABLE 2B

Additional water-based sizings.

| I.D. | Polymer | DI water (g) | Polymer (g) |
|---|---|---|---|
| S-9 | PET-WB50 | Prepared as a 20.7 wt. % solution | |
| S-10 | PVA-205 | 2480 | 276 |
| S-11 | PVA-502 | 1337 | 149 |
| S-12 | Glycerol | 450 | 42 |

Plasticized water-based sizings based on sizings S-1, S-2, and S-3 were prepared by combining the water-based sizings with glycerol and additional water as summarized in Table 3 to achieve about 30 wt. % solution of organics based on the total weight of the solution.

TABLE 3

Plasticized water-based sizings based on poly(2-ethyl-2-oxazoline) and glycerol.

| I.D. | Sizing solution | Sizing Sol'n (g) | Glycerol (g) | Water (g) | Wt. ratio polymer | Wt. ratio plasticizer |
|---|---|---|---|---|---|---|
| S-1P (80/20) | S-1 | 150 | 18.8 | 144 | 80 | 20 |
| S-1P (60/40) | S-1 | 115 | 38.4 | 166 | 60 | 40 |
| S-2P (90/10) | S-2 | 115 | 38.4 | 166 | 90 | 10 |
| S-2P (80/20) | S-2 | 150 | 18.8 | 144 | 80 | 20 |
| S-3P (80/20) | S-3 | 250 | 18.7 | 43.8 | 80 | 20 |
| S-3P (70/30) | S-3 | 225 | 29.0 | 67.5 | 70 | 30 |
| S-3P (60/40) | S-3 | 200 | 40.0 | 93.3 | 60 | 40 |

Plasticized water-based sizings were prepared by combining sizing S-5 (VA-CA) with glycerol (plasticizer) and water to achieve a 33-34 wt. % polymer solution. The resulting plasticized sizings are summarized in Table 4.

TABLE 4

Plasticized sizings based on vinyl acetate-crotonic acid copolymer with glycerol.

| I.D. | Sol'n S-5 (g) | Glycerol (g) | Water (g) | Wt. ratio polymer | Wt. ratio plasticizer |
|---|---|---|---|---|---|
| S-5P (80/20) | 125 | 9.3 | 21.9 | 80 | 20 |
| S-5P (70/30) | 110 | 14.2 | 33.1 | 70 | 30 |
| S-5P (60/40) | 90.2 | 18.2 | 42.2 | 60 | 40 |

Plasticized, water-based sizings based on sizings similar to S-8A (20:80 VP-VA/PVA-205) and S-8B (40:60 P-VA/PVA-205) were prepared by combining a 40 wt. % solids aqueous solution of VP-VA with a 25 wt. % solids aqueous solution of PVA-205. Glycerol was then added, and the resulting solution was diluted with water to a total solids content of 32%. The compositions were agitated on a roller for about 30 minutes. The resulting plasticized sizings are summarized in Table 5.

TABLE 5

Plasticized water-based sizings based on vinyl pyrrolidone-vinyl acetate copolymer and polyvinyl alcohol with glycerol.

| I.D. | Sizing solution | Wt. ratio polymer | Wt. ratio plasticizer |
|---|---|---|---|
| S-8A-P (75/25) | 20:80 VP-VA/PVA-205 (S-8A) | 75 | 25 |
| S-8A-P (50/50) | 20:80 VP-VA/PVA-205 (S-8A) | 50 | 50 |
| S-8A-P (25/75) | 20:80 VP-VA/PVA-205 (S-8A) | 25 | 75 |
| S-8B-P (25/75) | 40:60 VP-VA/PVA-205 (S-8B) | 25 | 75 |

Plasticized water-based sizings based on sizings S-10 (PVA-205) and S-11 (PVA-502) were prepared by combining the base coating with glycerol and deionized water. The compositions were agitated by shaking. The plasticized sizings are summarized in Table 6.

TABLE 6

Plasticized water-based sizings based on PVA and glycerol.

| I.D. | Sizing solution | Wt. ratio polymer | Wt. ratio plasticizer |
|---|---|---|---|
| S-10P (75/25) | PVA-205 (S-10) | 75 | 25 |
| S-10P (50/50) | PVA-205 (S-10) | 50 | 50 |
| S-10P (25/75) | PVA-205 (S-10) | 50 | 50 |
| S-10P (10/90) | PVA-205 (S-10) | 10 | 90 |
| S-11P (25/75) | PVA-502 (S-11) | 25 | 75 |

Sized spread tows of ceramic fibers were prepared by squeeze coating the sizing onto 10,000 denier NEXTEL 610 ceramic fiber (6-9 mm wide) from 3M Company. Following the application of the sizing, the tow was dried in-line at 120 to 140° C. and wound onto cores. The sizing coat weight was determined by the following Coat Weight Method:
  (i) measure the initial mass of a four-meter long sample;
  (ii) dry the sample for two minutes at 105° C. followed by two minutes for cool down;
  (iii) measure the weight of the dried sample ("Dry Weight");
  (iv) burn-off the sizing at 750° C. for five minutes followed by two minutes for cool down;
  (v) measure the final weight of sample with the sizing removed ("Final Weight"); and
  (vi) calculate the sizing wt. % as [(Dry Weight−Final Weight)/(Dry Weight)]×100%.

Tow flexibility was evaluated qualitatively by observing whether the tow retained the curvature of the core (curl) or lay flat during unwind, and by assessing the ease with which the sized tows could be bent. More flexible sizings would result in less curl and easier bending, while stiff tows would be more difficult to handle, and brittle tows would break. Tow flexibility was reported as low (L), medium (M), or high (H), with high being preferred.

Bundling was evaluated by the quality of the edge definition and the retention of the tow's full width upon unwinding. Superior bundling would result in better edge definition and width retention. Again, ratings of low, medium, and high were assigned, with high being preferred.

Room temperature tack ("RT-tack") was determined as follows. Sized spread tow samples were dried at 100° C. for twelve hours. After drying, samples were cut into 7.6 cm (3 inch) sections and joined together in pairs under a load of 2.3 to 4.5 kg (5 to 10 pounds). The joined section was 5.1 cm (2 inches) long leaving 2.5 cm (1 inch) unbonded at one end of the specimen where the spread tow could be gripped during the test. Tack strength was determined on a pass-fail basis by pulling the joined specimens apart. As little or no tack is desired to facilitate typical handing processes (e.g., winding and weaving), a specimen that came apart all at once and had little or no noticeable adhesion is indicated as "Pass." A specimen that came apart slowly and required a significant amount of force to pull apart is indicated as "Fail"

Heat-bonded tack ("HB-tack") was determined as follows. Sized spread tow samples were dried at 100° C. for twelve hours. After drying, samples were cut into 7.6 cm (3 inch) sections and joined together in pairs by adhering two samples of sized spread tow to each other with a soldering iron at 180° C. with 2.5 cm (1 inch) overlapping. After being allowed to cool to room temperature, some samples of the heat-bonded tows were pulled apart by a 180-degree peel test at a rate of 100 mm per minute. For some examples, the tack level was determined by averaging the load measured during peel and dividing by the width of the tow. The force to separate the samples was then assigned a rating of Low (L), Medium (M), or High (H). If no force was required to separate the sample, a grade of Fail (F) was assigned.

Water solubility was determined by submerging the sized tows in 90° C. water for one minute. Samples that became limp and lost the rigidity provided by the sizing, were identified as "Soluble" and samples that remained rigid were identified as "Insoluble."

The heat-bond tack and tow flexibility were used to perform initial screening to identify samples for further investigation. The screening results are summarized in Table 7A. For heat-bond tack (HB-Tack), "Pass" indicates samples with sufficient tack, and "Fail" indicates samples with low or no tack. For tow flexibility ("Tow-Flex"), "Fail" indicates samples that were too stiff or brittle for routine handling of tows.

TABLE 7A

Sized spread tow screening results.

Sizings without plasticizer

| Sample | Sizing | HB-Tack | Tow-Flex |
|---|---|---|---|
| 1 | S-3 | | stiff |
| 2 | S-6 | Fail | stiff |
| 3 | S-7 | Fail | stiff |
| 4 | S-9 | Fail | |
| 5 | S-10 | Fail | |
| 6 | S-12 | Fail | |

Sizings with plasticizer

| Sample | Sizing | HB-tack |
|---|---|---|
| 7 | S-1P (80/20) | Fail |
| 8 | S-1P (60/40) | Fail |
| 9 | S-2P (90/10) | Pass |
| 10 | S-2P (80/20) | Pass |
| 11 | S-3P (80/20) | Pass |
| 12 | S-3P (70/30) | Pass |
| 13 | S-3P (60/40) | Fail |
| 14 | S-5P (80/20) | Pass |
| 15 | S-5P (70/30) | Fail |
| 16 | S-5P (60/40) | Fail |
| 17 | S-8A-P (75/25) | Pass* |
| 18 | S-8A-P (50/50) | Pass |
| 19 | S-8A-P (25/75) | Pass |
| 20 | S-8B-P (50/50) | Pass |
| 21 | S-8B-P (25/75) | Fail |
| 22 | S-10P (75/25) | Fail |
| 23 | S-11P (25/75) | Fail |

*Sample 17 [S-8A-P (75/25)] had good bundling but may be too stiff for some applications.

Based on the screening results, select samples were also evaluated using the tests described herein. The results of these tests are summarized in Table 7B.

TABLE 7B

Sized spread tow performance results.

| Sample | Sizing | sizing wt. % | flexibility (L/M/H) | bundling (L/M/H) | RT-tack | HB-tack | water solubility |
|---|---|---|---|---|---|---|---|
| 4 | S-9 | 3.5% | L | H | — | Fail | insoluble |
| 5 | S-10 | 1.3% | H | L | — | Fail | soluble |
| 6 | S-12 | 0.6% | H | L | — | Fail | soluble |
| 7 | S-1P (80/20) | 4.9% | M | M | Pass | Low | soluble |
| 8 | S-1P (60/40) | 3.2% | H | M | Pass | Low | soluble |
| 11 | S-3P (80/20) | 7.4% | M | M | Pass | High | soluble |
| 13 | S-3P (60/40) | 5.0% | H | M | Pass | Low | soluble |
| 17 | S-8A-P (75/25) | 6.2% | M | M | Pass | High | soluble |
| 18 | S-8A-P (50/50) | 6.1% | M | M | Pass | High | soluble |
| 19 | S-8A-P (25/75) | 6.7% | H | M | Pass | Medium | soluble |
| 22 | S-10P (75/25) | 1.5% | L | H | — | Low | soluble |
| 24 | S-10P (50/50) | 3.1% | M | H | — | Medium | soluble |
| 25a | S-10P (25/75) | 1.5% | H | M | — | Low | soluble |
| 25b | S-10P (25/75) | 3.6% | H | M | — | High | soluble |
| 26 | S-10P (10/90) | 0.5% | H | L | — | Low | soluble |
| 23 | S-11P (25/75) | 4.2% | H | M | — | Fail | soluble |

Modulus Procedure. The temperature dependent moduli of the sizings were measured using a TA ARES-G2 rheometer with 8 mm parallel stainless-steel plates, a forced convection with nitrogen flow, and TA TRIOS software. Sizing samples were placed in an aluminum tray and dried from the aqueous solutions at 105° C. for one hour in a convection oven. Samples were re-dried as needed to ensure that water was not absorbed from humidity in the air, as water can act as a plasticizer.

The dried samples were loaded at room temperature, then heated to 200° C. to melt between the plates and trimmed to form uniform samples. The gap between the plates was between 0.5 and 1 mm and was controlled throughout the test using axial force control centered at zero axial force plus or minus 10 grams.

The sample was equilibrated at 200° C. for one minute before beginning a small angle, oscillatory shear temperature ramp from 200° C. to 0° C. at a rate of 3° C. per minute. The strain was controlled within the linear range for all samples with the frequency fixed at 1 Hertz. Measurements of the linear range for samples was done by oscillation amplitude (strain) sweep at a frequency of 1 Hertz at various temperatures within the temperature ramp range.

The results of the modulus tests are summarized in Table 8. Samples of sizings available from 3M Company are included for comparison. The modulus of Sample 1 was repeated three times with an additional sample to determine the average and standard deviation in order to better define the upper limit on the modulus at 25° C. The results are summarized in Table 9.

Based on the qualitative results in Tables 7A and 7B, and the modulus data in Tables 8 and 9, the present inventors determined that two parameters could be used to identify suitable heat-activated sizings: the modulus at 25° C., and the temperature at which the modulus is reduced to 100,000 Pa.

First, the modulus at 25° C. should be selected to exceed a lower threshold value to eliminate tack at typical roll-to-roll and handling conditions. The minimum modulus at 25° C. should be at least 1.5E+08 pascals (150 MPa). In some embodiments, the minimum modulus at 25° C. is at least 2E+08 pascals (200 MPa). In addition, the modulus at 25° C. should not exceed a certain value to minimize stiffness and curl. Generally, the modulus at 25° C. should be no greater 4.0E+08 pascals (400 MPa), e.g., no greater than 3.5E+08 pascals (350 MPa), and in some embodiments, no greater than 3E+08 pascals (300 MPa).

Second, to achieve an acceptable bond, the sizing should be heated until the modulus is no greater than 100,000 Pa, referred to herein as T(100 kPA). As higher temperatures generally lead to more expensive, complicated and slower operations, the temperature at which the modulus reaches 100,000 Pa should be no greater than 160° C. In some embodiments, the (T100 kPA) is no greater than 135° C., or even no greater than 100° C. Generally, there is no lower limit to this temperature, except that the modulus at 25° C. must meet the minimum values discussed above. However, to provide a robust window for handling, in some embodiments, T(100 kPA) is at least 40° C., e.g., at least 45° C., or even at least 50° C.

TABLE 8

Modulus at various temperatures measured according to the Modulus Procedure.

| Sample | Ex/CE | Sizing | Modulus 25° C. (Pa) | Modulus 45° C. (Pa) | Modulus 90° C. (Pa) | Modulus 100° C. (Pa) | Modulus 135° C. (Pa) | Modulus 160° C. (Pa) | Modulus 180° C. (Pa) | Temp (° C.) 100,000 Pa |
|---|---|---|---|---|---|---|---|---|---|---|
| 1 | CE | S-3 | 3.5E+08 (1) | 3.2E+08 | 1.6E+06 | 480,000 | 84,000 | 33,000 | 14,000 | 129 |
| 2 | CE | S-6 | N/A | 4.8E+08 (2) | 1.6E+07 | 1.1E+07 | 3.1E+06 | 690,000 | 100,000 | 180 |
| 3 | CE | S-7 | N/A | 4.2E+08 (2) | 3.5E+08 | 2.6E+08 | 340,000 | 28,000 | 4,600 | 147 |
| 9 | Ex | S-2P (90/10) | 3.4E+08 | 2.4E+08 | 400,000 | 170,000 | 11,000 | 1,300 | 300 | 107 |
| 10 | Ex | S-2P (80/20) | 2.2E+08 | 6.1E+07 | 100,000 | 46,000 | 3,600 | 450 | 200 | 91 |
| 11 | Ex | S-3P (80/20) | 1.9E+08 | 2.2E+07 | 91,000 | 57,000 | 14,000 | 5,100 | 1,900 | 88 |
| 12 | CE | S-3P (70/30) | 3.9E+07 | 4.5E+06 | 38,000 | 25,000 | 6,000 | 2,200 | 770 | 75 |
| 13 | CE | S-3P (60/40) | 2.0E+07 | 1.8E+06 | 27,000 | 18,000 | 6,300 | 3,000 | 850 | 50 |
| 14 | Ex | S-5P (80/20) | 1.8E+08 | 4.4E+07 | 61,000 | 33,000 | 4,500 | 1,400 | 400 | 82 |
| 15 | CE | S-5P (70/30) | 6.2E+07 | 3.2E+07 | 26,000 | 16,000 | 3,600 | 1,200 | 400 | 71 |

TABLE 8-continued

Modulus at various temperatures measured according to the Modulus Procedure.

| Sample | Ex/CE | Sizing | Modulus 25° C. (Pa) | Modulus 45° C. (Pa) | Modulus 90° C. (Pa) | Modulus 100° C. (Pa) | Modulus 135° C. (Pa) | Modulus 160° C. (Pa) | Modulus 180° C. (Pa) | Temp (° C.) 100,000 Pa |
|---|---|---|---|---|---|---|---|---|---|---|
| 16 | CE | S-5P (60/40) | 6.8E+07 | 4.4E+07 | 34,000 | 20,000 | 3,200 | 700 | 300 | 75 |
| 17 | Ex | S-8A-P (75/25) | 3.1E+08 | 1.5E+08 | 1.1E+07 | 8.1E+06 | 2.1E+06 | 81,000 | 24,000 | 158 |
| 18 | Ex | S-8A-P (50/50) | 1.5E+08 | 4.7E+07 | 6.5E+06 | 5.0E+06 | 880,000 | 76,000 | 19,000 | 156 |
| 19 | CE | S-8A-P (25/75) | 9.8E+07 | 3.2E+07 | 4.4E+06 | 3.4E+06 | 220,000 | 33,000 | 9,000 | 145 |
| 27 | CE | S-8A | N/A | 4.1E+08 (2) | 2.9E+07 | 1.3E+07 | 3.8E+06 | 760,000 | 96,000 | 179 |
| 28 | CE | 3M 324 sizing | 9.2E+07 | 4.0E+07 | 760,000 | 720,000 | 310,000 | 150,000 | 71,000 | 166 |
| 29 | CE | 3M 299 sizing | 3.7E+07 | 3.1E+06 | 1.6E+06 | 970,000 | 670,000 | 540,000 | 280,000 | 190 |
| 30 | CE | 3M 500 sizing | 1.9E+06 | 14,800 | 50 | 20 | <20 | <20 | <20 | 36 |
| 31 | CE | 3M 502 sizing | 7.1E+06 | 800 | 230 | 200 | 120 | 100 | 90 | 42 |

(1) Measured at 30° C.
(2) Measured at 50° C.

TABLE 9

Modulus data for Sample 1 (Sizing S-3).

| | Repl. 1 | Repl. 2 | Repl. 3 | Table 8 | Average | % Std dev |
|---|---|---|---|---|---|---|
| 25 C. | 4.50E+08 | 4.00E+08 | 4.20E+08 | | 4.2E+08 | 4.9 |
| 30 C. | 4.50E+08 | 3.90E+08 | 4.10E+08 | 3.50E+08 | 4.0E+08 | 9.0 |
| 45 C. | 4.10E+08 | 3.60E+08 | 3.80E+08 | 3.20E+08 | 3.7E+08 | 8.9 |
| 90 C. | 2.00E+06 | 1.80E+06 | 1.90E+06 | 1.60E+06 | 1.8E+06 | 8.1 |
| 100 C. | 600000 | 530000 | 570000 | 480000 | 545000.0 | 8.3 |
| 135 C. | 97000 | 86000 | 90000 | 84000 | 89250.0 | 5.6 |
| 160 C. | 35000 | 30000 | 33000 | 33000 | 32750.0 | 5.5 |
| 180 C. | 13000 | 12000 | 13000 | 14000 | 13000.0 | 5.4 |
| @ 100k Pa | 134 | 131 | 132 | 129 | 132 | |

The sized tows of the present disclosure may be used to form any of a wide range of articles. Such articles generally comprise at least one tow having a soluble, heat-activated sizing and a second tow, which may also include a soluble, heat activated sizing. In some embodiments, the tows are arranged such that they are adjacent to one another. In some embodiments, the tows are arranged such that the tows that are next to each other overlap in a binding region. In some embodiments, the amount of overlap is minimized to, e.g., reduce variations in thickness. In some embodiments, neighboring tows may overlap by no more than 10% of the average width of the tows, e.g., no more than 5% or even no more than 2% of the average width of the tows. By heating the binding region, the sizing is activated, and the tows are bonded together.

Generally, a tow has a longitudinal axis aligned with the fibers. In some embodiments, the tows are aligned substantially parallel with another, e.g., to form a unidirectional tape without the need for stitching. In some embodiments, the angle between the longitudinal axes of substantially parallel tows is no greater than 10 degrees, for example no greater than 5 degrees, or even no greater than 2 degrees.

For example, in some embodiments, two or more of the sized tows of the present disclosure may be placed adjacent to each other. In some embodiments, adjacent tows may overlap. In some embodiments, the tows overlap by no greater than 5 mm, e.g., no greater than 3 mm, or even no greater than 1 mm. The tows may then be heated to a temperature above T(100 kPa) for a period of time, e.g., 1 to 10 minutes, e.g., 2 to 8 minutes, or even 3 to 6 minutes. Upon cooling, the adjacent tows are bonded together forming a unidirectional tape.

In some embodiments, unsized tows may be placed adjacent each other and either touching or overlapping. The tacky sizings of the present disclosure may then be applied to the unsized tows using any conventional means, e.g., spraying, or immersion. If desired, excess sizing may be removed. The tows may then be heated to a temperature above T(100 kPa) for a period of time, e.g., 1 to 10 minutes, e.g., 2 to 8 minutes, or even 3 to 6 minutes. Upon cooling, the adjacent tows are bonded together forming a unidirectional tape.

In some embodiments, two or more tows may be aligned near each other but spaced apart. For example, in some embodiments, adjacent tows may be at least 1 mm apart, e.g., 5 mm, 10 mm, or even 20 mm apart. In some embodiments, adjacent tows are no greater than 75 mm, e.g., no greater than 50 mm, or even no greater than 30 mm apart. to form a unidirectional tape. Cross fibers may then be placed against the unidirectional tows and aligned at some angle, e.g., about 90 degrees, relative to the unidirectional tows. Any such fibers, including bundles, yarns, and elliptical tows of polymeric, glass or ceramic materials may be used. Although not required, in some embodiments, the cross fibers may be woven between the unidirectionally aligned tows.

In some embodiments, the aligned tows are sized with a tacky sizing of the present disclosure. In some embodiments, the cross fibers are sized with the tacky sizing of the present disclosure. In some embodiments, both the tows and the cross fibers are sized. The structure may then be heated to a temperature above T(100 kPa) for a period of time, e.g., 1 to 10 minutes, e.g., 2 to 8 minutes, or even 3 to 6 minutes. Upon cooling, the adjacent tows are bonded together forming a unidirectional tape.

In some embodiments, one or more of the sized tows may be preheated prior to contacting another tow. In some embodiments, the sized tows may be preheated to a temperature greater than T(100 kPa). In some embodiments, such preheated tows may form an adequate bod to other tows without the need for additional heating. In some embodiments, additional heat and or pressure may be applied after contact.

Referring to FIG. 1, conventional woven fabric (100) comprises warp (140) and fill (or weft) (150). Warp (140) comprises a plurality of first tows, e.g., spread tows (110). Each first spread tow comprises a plurality of first ceramic fibers (115) substantially aligned along a common axis. The plurality of first spread tows are spaced apart and aligned with first axis (X1). Fill (150) comprises a plurality of second tows, e.g., spread tows (120). Each second spread tow comprises a plurality of second ceramic fibers (125) substantially aligned along a common axis. The plurality of second spread tows are spaced apart and aligned with second axis (X2).

As shown, the second tows (120) of fill (150) are interlaced with the first spread tows (110) of warp (140) in a plain weave pattern. Second axis X2 may be aligned at any angle relative to first axis X1, such that first axis X1 and second axis X2 intersect at angle B. In the plain weave pattern of FIG. 1, the axes are approximately perpendicular, i.e., B is about 90 degrees.

Other weaving patterns, resulting in other angles of intersection can be used. When two axes intersect at an angle other than 90 degrees, they will form both an acute angle and an opposite obtuse angle. For clarity, all intersection angles, regardless of the spread tow orientations will be referred to by the acute angle. Therefore, all intersection angles will range from great than 0 to 90 degrees. For example, the angle of intersection may be due to normal manufacturing variations, the angle of intersection (B) may vary by about +/−5 degrees. Therefore, as used herein, all intersection angles allow for such variation. For example, if the stated intersection angle is 45 degrees this would cover intersection angles ranging from 40 to 50 degrees.

In some embodiments, the first axis X1 and second axis X2 intersect at angle B, where B is greater than 40 degrees, e.g., greater than 50 degrees, or even greater than 60 degrees. In some embodiments, angle B will be no greater than 80 degrees, e.g., no greater than 70 degrees, or even no greater than 50 degrees. For example, in some embodiments, angle B will be between 40 and 80 degrees, for example, between 50 and 70 degrees, e.g., about 60 degrees (i.e., 60+/−5 degrees). In some embodiments, angle B will be between 40 and 60 degrees, e.g., between 40 and 50 degrees, e.g., about 45 degrees (i.e., 45+/−5 degrees).

Because the sized spread tows of the present disclosure are not tacky at typical handling conditions, they may be used in such conventional fabrics. However, with the heat activated sizings of the present disclosure non-woven, stacked fabrics can be formed. With a stacked fabric, the tows are simply overlaid at the desired angles, and do not need to be woven; thus, avoiding costs and minimizing the damage and matrix rich regions associated with weaving.

Figure 2:
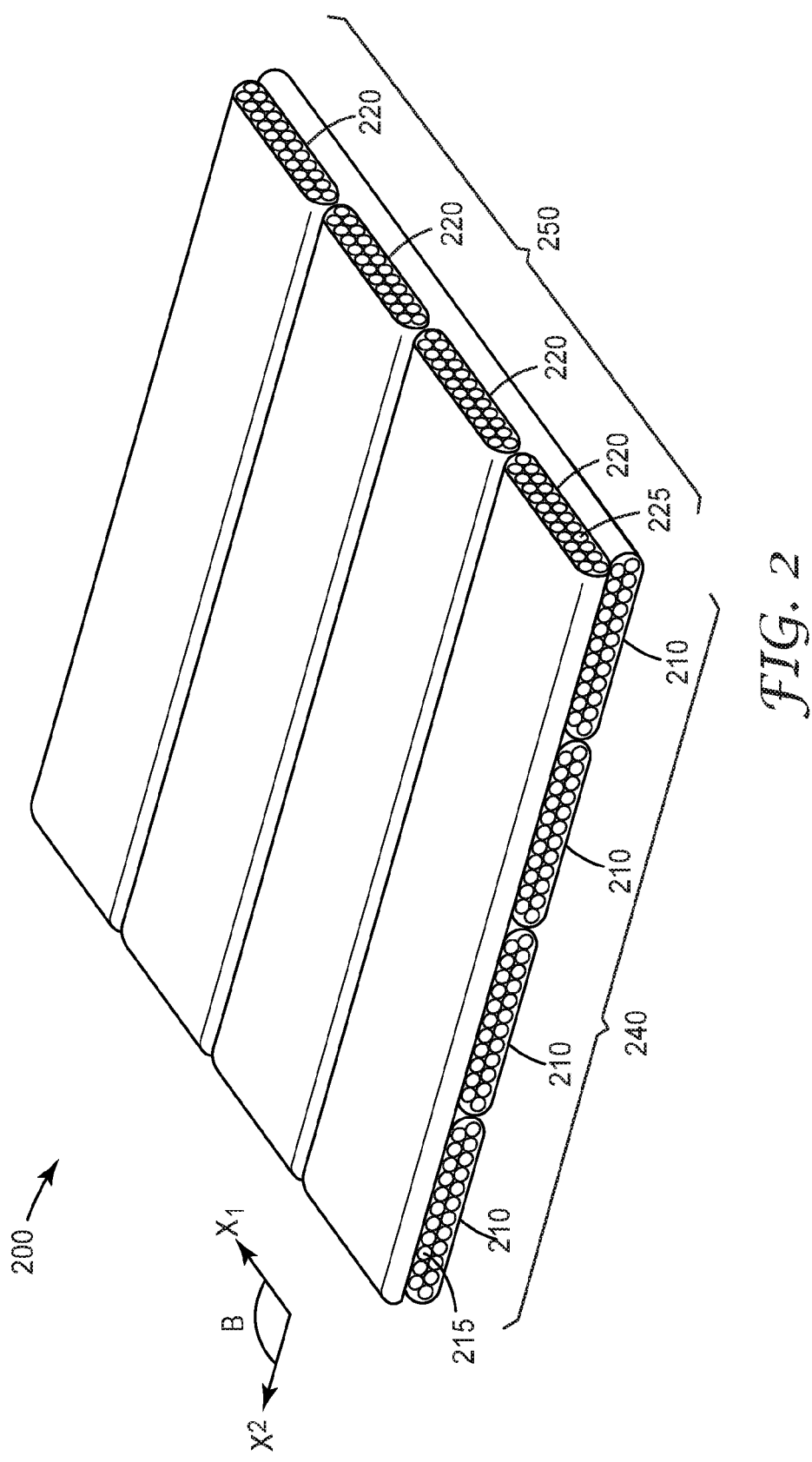
FIG. 2 illustrates a stacked fabric according to some exemplary embodiments of the present disclosure.

Referring to FIG. 2, exemplary stacked fabric (200) according to some embodiments of the present disclosure is shown. Although not a woven fabric, the term "warp" will be used to describe the tows aligned with first axis, X1, and the terms "fill" or "weft" be used to describe the tows aligned with second axis, X2; wherein first axis X1 and second axis X2 intersect at angle B.

Warp (240) comprises a plurality of first tows, e.g., spread tows (210), each comprising a plurality of first ceramic fibers (215) substantially aligned along a common axis. Fill (250) comprises a plurality of second tows, e.g., spread tows (220), each comprising a plurality of second ceramic fibers (225) substantially aligned along a common axis. Generally, the spread tows (210) of warp (240) comprise sized spread tows according to the present disclosure. In some embodiments, spread tows (240) of fill (250) also comprise sized spread tows according to the present disclosure.

As shown, rather than interlacing the second tows with the first tows in a plain weave pattern, the second spread tows (220) are merely stacked upon the first spread tows (210), such that first axis X1 and second axis X2 intersect at angle B. In some embodiments, additional layers may be formed by stacking additional tows. Generally, the intersection angle between the axes of the tows of adjacent layers is not limited. In some embodiments, this angle is less than 10, e.g., less than 5, or even less than 2 degrees. In some embodiments, this angle is at least 30, e.g., at least 40, at least 50, or even at least 60 degrees. In some embodiments, this angle is less than 80 degrees, e.g., no greater than 70 degrees.

The stacked tows may then be heated to activate the sizing and bond the tows together, forming a fabric without requiring weaving. Heat and, optionally, pressure may be applied using conventional means. Bonding may be performed after each addition of another layer of tows or may be applied after three or more layers have been stacked.

Generally, the sized spread tows of the present disclosure and the articles made from them, e.g., tapes and fabrics (e.g., stacked fabrics) may be used with conventional matrices and forming operations as traditional tows. In some embodiments, the sized spread tows and articles made from them can be used with a ceramic matrix slurry, e.g., a water-based ceramic matrix slurry. However, in some embodiments, the heat-activated sizings are designed to be soluble in the slurry, e.g., to dissolve or disperse in the solvent, e.g., water. Therefore, it is not necessary to perform any cleaning steps such as burning to remove the sizing prior to infusing the tows with the matrix slurry.

Generally, the sizing may be applied to the fibers using any known means. In some embodiments, the fibers are dip coated. In some embodiments, the sizing may be sprayed on the fibers. In some embodiments, the fibers may be squeeze coated with the sizing.

Exemplary unidirectional articles were prepared as follows.

Unidirectional Fabric #1 was prepared from 10,000 denier spread tow NEXTEL 610 ceramic fiber from 3M. The spread tow was sized with commercial sizing 501 from 3M Company at 2 wt. %. The sized tow was cut into ten pieces, each 15.2 cm (6 inch) long. The ten pieces were placed parallel to each other and spaced 25 mm apart. The ends were taped with aluminum foil tape to hold them in place.

A synthetic yarn of polyvinyl alcohol (SOLVRON S62 yarn from Nitivy Co., LTD.) was submerged in a solution of the S-3P (80/20) tacky sizing and then drawn out, with the excess solution drained off the fiber by pulling the fiber through an opening approximately twice the width of the fiber. The coated yarn was then cut in 30.5 cm (12 inch) segments and laid perpendicular to the spread tow fiber segments, again with a 25 mm spacing. The edges were taped with Al foil to secure them in place. This formed a grid (or fabric) of spread tows of ceramic fibers in one direction and polymer fibers sized with a tacky sizing of the present disclosure in the normal direction.

This fabric was heated at 100° C. for 5 minutes, then allowed to cool to 25° C. before removing the Al tape from all edges. The fabric demonstrated sufficient structural integrity to be picked up by either the spread tow or fibers and maintain the 25 mm×25 mm grid.

The process was repeated, except that the synthetic yarn was used without applying the tacky sizing. The resulting fabric had no structural integrity and collapsed when picked up.

Unidirectional Fabric #2 was prepared from 10,000 denier spread tow NEXTEL 610 ceramic fiber from 3M. The spread tow was sized with the S-3P (80/20) tacky sizing at 7.4 wt. %. The sized tow was cut into ten pieces, each 15.2 cm (6 inch) long. The ten pieces were placed parallel to each other with 0.5 to 1 mm of overlap between adjacent tows. The ends were taped with aluminum foil tape to hold them in place.

This unidirectional construction was heated at 100° C. for 5 minutes, then allowed to cool to 25° C. before removing the Al tape from all edges. The resulting unidirectional fabric demonstrated sufficient structural integrity to be picked up by any of the spread tows while maintaining the unidirectional structure.

This process was repeated except that the spread tow was sized with sizing 501 from 3M Company at 2 wt. %. The fabric showed no structural integrity and collapsed when picked up.

Unidirectional Fabric #3 was prepared from 10,000 denier spread tow NEXTEL 610 ceramic fiber from 3M. The spread tow was sized with the S-3P (80/20) tacky sizing at 2.9 wt. %. The sized tow was cut into four pieces. The four pieces were placed parallel to each other with 0.5 to 1 mm of overlap between adjacent tows. The sample was placed between two sheets of fluoropolymer film and inserted between two 18 cm×18 cm aluminum plates.

This sandwich construction was placed between the platens of a WABASH hydraulic heat press, preheated to 120° C. The platens were then compress to 3100 N (700 lbf) and held for five minutes. The resulting unidirectional fabric demonstrated sufficient structural integrity to be picked up by any of the spread tows while maintaining the unidirectional structure.

Exemplary bidirectional articles were prepared as follows.

Biaxial Fabric #1 was prepared from 10,000 denier spread tow NEXTEL 610 ceramic fiber from 3M, sized with the S-3P (80/20) tacky sizing at 2.9 wt. %. The sized tow was cut into eight pieces. Four of these pieces were placed parallel to and immediately next to each other, forming a first layer having tows aligned with a first axis. Another four pieces of the sized spread tow were aligned with a second axis and overlaid on the first layer, such that the angle between the first axis and the second axis was about 90 degrees to form a stacked fabric similar to FIG. 2.

This construction was placed between two pieces of fluoropolymer film and inserted between two 18 cm×18 cm aluminum plates. This sandwich construction was placed between the platens of a WABASH hydraulic heat press, preheated to 120° C. The platens were then compress to 31,000 N (7000 lbf) and held for five minutes. The resulting bidirectional, stacked fabric had sufficient structural integrity to be picked up by any of the spread tow pieces while maintaining the stacked fabric structure.

Biaxial Fabric #2 was prepared from 10,000 denier spread tow NEXTEL 610 ceramic fiber from 3M, sized with the S-3P (80/20) tacky sizing at 2.9 wt. %. The sized tow was cut into eight pieces. A first set of four of these pieces were placed parallel to and next to each other, forming a first layer having tows aligned with a first axis. A second set of four pieces of the sized spread tow were aligned perpendicular to the first axis and woven in plain weave pattern to form a woven fabric similar to FIG. 1.

This construction was placed between two pieces of polymeric film and inserted between two 18 cm×18 cm aluminum plates. This sandwich construction was placed between the platens of a WABASH hydraulic heat press, preheated to 120° C. The platens were then compress to 31,000 N (7000 lbf) and held for five minutes. The resulting bidirectional, stacked fabric had sufficient structural integrity to be picked up by any of the spread tow pieces while maintaining the woven fabric structure.

What is claimed is:

1. A sized tow comprising a tow of ceramic fibers selected from the group consisting of oxide-based ceramic fibers and non-oxide based ceramic fibers that are based on carbides and nitrides, including oxynitrides, oxycarbides and oxycarbonitrides, and a sizing composition comprising a polymer covering at least a portion of the tow, wherein, as measured according to a Modulus Procedure, the sizing composition has a first modulus at 25° C. of at least 150 megapascals (MPa) and no greater than 350 MPa; and a second modulus of 100,000 pascals (Pa) at a temperature of no greater than 160° C., and wherein a coat weight of the sizing composition is between 2 and 10 weight percent, inclusive, based on the total weight of the sized tow.

2. The sized tow of claim 1, wherein the ceramic fibers comprise alpha-alumina.

3. The sized tow of claim 1, wherein the sizing composition is soluble in water.

4. The sized tow of claim 1, wherein the tow of fibers is a spread tow.

5. The sized tow of claim 1, wherein the first modulus is at least 200 MPa.

6. The sized tow of claim 1, wherein the first modulus is no greater than 300 MPa.

7. The sized tow of claim 1, wherein the temperature at which the second modulus is 100,000 Pa is at least 40° C.

8. The sized tow of claim 1, wherein the temperature at which the second modulus is 100,000 Pa is no greater than 135° C.

9. The sized tow of claim 8, wherein the temperature at which the second modulus is 100,000 Pa is between 45° C. and 100° C., inclusive.

10. The sized tow of claim 1, wherein the polymer of the sizing composition comprises a poly(2-ethyl-2-oxazoline) polymer.

11. The sized tow of claim 1, wherein the polymer of the sizing composition comprises a vinyl acetate copolymer.

12. The sized tow of claim 11 wherein the vinyl acetate copolymer comprises a vinylpyrrolidone-vinyl acetate copolymer.

13. The sized tow of claim 11, wherein the vinyl acetate copolymer comprises a vinyl acetate-crotonic acid copolymer.

14. The sized tow of claim 13, wherein the polymer of the sizing composition further comprises a polyvinyl alcohol.

15. The sized tow of claim 1, wherein the sizing composition further comprises a plasticizer for the polymer.

16. The sized tow of claim 15, wherein the plasticizer is a polyol.

17. The sized tow of claim 16, wherein the polyol is glycerol.

18. A method of making an article comprising positioning a first tow of fibers in contact with a second tow of fibers forming a contact area between the tows, wherein the first tow of fibers comprises a first sized tow of claim 1; heating at least a portion of the contact area to a temperature greater than the temperature at which the second modulus of the sizing composition is 100,000 Pa, and bonding the first tow of fibers to the second tow of fibers.

19. The method of claim 18, wherein the second tow of fibers comprises a second sized tow of claim 1.

20. The method of claim 18, wherein heating at least a portion of the contact area to a temperature greater than the temperature at which the second modulus of the sizing composition is 100,000 Pa comprises preheating the first tow to the temperature greater than the temperature at which the second modulus of the sizing composition is 100,000 Pa.

21. An article comprising a first sized tow of fibers of claim 1 having a first longitudinal axis and a second tow of sized fibers of claim 1 having a second longitudinal axis, wherein the first and second tows are bonded to each other.

22. The article of claim 21, wherein the first and second tows are aligned such that the angle between the first and second longitudinal axes is at least 30 degrees and no greater than 90 degrees.

23. The article of claim 22, wherein the second tows are stacked on the first tows.

* * * * *